United States Patent
Jays et al.

(10) Patent No.: US 10,517,439 B2
(45) Date of Patent: *Dec. 31, 2019

(54) STAND MIXERS

(71) Applicant: KENWOOD LIMITED, Havant, Hampshire (GB)

(72) Inventors: Nick Jays, Havant (GB); Roland Eden, Havant (GB)

(73) Assignee: KENWOOD LIMITED, Havant, Hampshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/206,126

(22) Filed: Nov. 30, 2018

(65) Prior Publication Data

US 2019/0090695 A1    Mar. 28, 2019

Related U.S. Application Data

(63) Continuation of application No. 15/029,425, filed as application No. PCT/GB2014/053593 on Dec. 3, 2014, now Pat. No. 10,154,760.

(30) Foreign Application Priority Data

Dec. 3, 2013 (GB) .................................. 1321291.5

(51) Int. Cl.
*A47J 43/044* (2006.01)
*A47J 43/08* (2006.01)
(Continued)

(52) U.S. Cl.
CPC ........... *A47J 43/087* (2013.01); *A47J 43/044* (2013.01); *B01F 7/00883* (2013.01);
(Continued)

(58) Field of Classification Search
CPC .............................. A47J 43/087; A47J 43/044
(Continued)

(56) References Cited

U.S. PATENT DOCUMENTS 2,801,545 A    8/1957 Schottle
2,822,485 A    2/1958 Braun et al.
(Continued)

FOREIGN PATENT DOCUMENTS

CN    202775969 U    3/2013
EP    1 430 824 A1    6/2004
(Continued)

OTHER PUBLICATIONS

International Search Report and Written Opinion of the International Searching Authority for PCT/GB2014/053593, dated Feb. 11, 2015; ISA/EP.

(Continued)

*Primary Examiner* — David L Sorkin
(74) *Attorney, Agent, or Firm* — Harness, Dickey & Pierce, P.L.C.

(57) ABSTRACT

A stand mixer 10 comprises a head unit 50 having a lower surface presenting, in operation, a downwardly-facing drive outlet for driving in rotation at least one tool suspended therefrom. The head unit is supported with the downwardly-facing drive outlet above a receiving location 30 for a mixing bowl 40. Driving means, including an electric motor 70 and associated transmission means for conveying rotary drive to the drive outlet, are provided. The mixer further comprises first 80 and second 90 coaxial driving outlets presented on an upper surface 52 of the head unit 50; the coaxial outlets 80, 90 run at different speeds and are driven from the motor 70 by means of an epicyclic gearbox 100.

(Continued)

The motor 70 is housed in the support means 60 with its drive shaft 72 in substantial alignment with the coaxial drive outlets 80, 90.

14 Claims, 5 Drawing Sheets

(51) Int. Cl.
  *B01F 7/00* (2006.01)
  *B01F 15/00* (2006.01)

(52) U.S. Cl.
  CPC .......... *B01F 15/00538* (2013.01); *A47J 2043/04454* (2013.01); *A47J 2043/04463* (2013.01); *B01F 2015/00584* (2013.01); *B01F 2015/00623* (2013.01)

(58) Field of Classification Search
  USPC .............................. 366/197, 205, 206, 314
  See application file for complete search history.

(56) References Cited

U.S. PATENT DOCUMENTS

| | | | |
|---|---|---|---|
| 10,154,760 B2* | 12/2018 | Jays | ............ A47J 43/087 |
| 2003/0066917 A1 | 4/2003 | Brezovnik et al. | |
| 2007/0131050 A1 | 6/2007 | Nicholson | |
| 2012/0129643 A1 | 5/2012 | Cheung et al. | |

FOREIGN PATENT DOCUMENTS

| | | |
|---|---|---|
| EP | 2 471 425 A1 | 7/2012 |
| GB | 861 915 A | 3/1961 |
| GB | 2 398 851 A | 9/2004 |
| GB | 2 454 172 A | 5/2009 |
| JP | H-08-173332 A | 7/1996 |
| WO | WO-2013-090424 A2 | 6/2013 |

OTHER PUBLICATIONS

Search Report of the Great Britain Priority Application No. 1321291.5 dated May 29, 2014.

\* cited by examiner

STAND MIXERS

CROSS-REFERENCE TO RELATED APPLICATIONS

This application is a Continuation Application of U.S. application Ser. No. 15/029,425 filed Apr. 14, 2016, which is a 371 U.S. National Stage of International Application No. PCT/GB2014/053593, filed on Dec. 3, 2014 and claims priority to Great Britain Application No. 1321291.5, filed Dec. 3, 2013. The entire disclosures of the above applications are incorporated herein by reference.

BACKGROUND

This invention relates to stand mixers, by which is meant the kind of motor-driven kitchen machine which is used to mix, or otherwise process, ingredients in a bowl by powered movement of one or more shanked tools which depend into the bowl from a head unit that carries a downwardly-facing drive outlet, powered by the motor, to which the shank, or shanks, of the tool, or tools can be fitted for use.

Such mixers conventionally comprise a generally C-shaped casing which provides a pedestal-like support for a mixing bowl, and a generally upright support portion supports the head unit so that it extends overhead of the bowl. Moreover, the powered movement of the shanked tool or tools is often, though not necessarily, planetary in nature.

Stand mixers such as the Kenwood Chef kitchen machine are well known and have been well established in use for many years. Over the years, mixers of this kind have been adapted and developed so as to perform an ever broadening range of functions, and many such appliances provide, for example, a plurality of additional drive outlets running at different speeds and with differing torque characteristics, thus enabling them to drive a number of attachments, such as blenders and mincers, which, between them, can perform a wide range of tasks. This is beneficial for the user, because a single machine can be used to selectively host several attachments and thus perform a range of tasks which would otherwise require the purchase and storage of several bespoke kitchen machines, each with their own motors and associated equipment.

Typically, the additional drive outlets are located at different places on the stand mixer body, depending to an extent on the configuration and purpose of the attachments they are to drive. In particular, it is usual for a high-speed outlet, capable of powering a blender attachment, for example, to be provided on the upper surface of the head unit and close to its junction with the upright portion of the stand mixer's casing.

If the stand mixer is also intended to drive a food processor attachment, however, it is necessary either to provide a separate outlet elsewhere on the stand mixer or to provide a separate, external gearbox that can be coupled to the blender drive outlet to reduce the driving speed and also convert the drive outlet configuration to one that can couple to a conventional food processor bowl. Neither option is particularly desirable, since the provision of separate drive outlets for blender and food processor attachments is awkward and costly, requiring additional gears and pick-offs from the main drive train, and the storage and fitment of separate gearboxes is a nuisance for the consumer.

It is also necessary to provide an economical and robust coupling between the motor and its primary drive train, the additional outlets and the slow-speed planetary or other drive outlet used to power the aforementioned shanked tool or tools, such as dough hooks and the like, which are provided for mixing ingredients placed in the bowl that stands on the pedestal beneath the head unit.

It is an object of the invention to address some at least of the above considerations and, in accordance with one aspect of the invention there is provided a stand mixer comprising a head unit having a lower surface presenting, in operation, a downwardly-facing drive outlet for driving in rotation at least one tool suspended therefrom, support means for supporting said head unit with said downwardly-facing drive outlet above a receiving location for a mixing bowl, and driving means including an electric motor and associated transmission means for conveying rotary drive to said drive outlet, the mixer being characterised by the provision of first and second coaxial driving outlets presented on an upper surface of said head unit; said coaxial outlets running at different speeds and being driven from said motor by means of an epicyclic gearbox; the motor being housed in said support means with its drive shaft in substantial alignment with said coaxial drive outlets. By this means, attachments requiring different driving characteristics can be driven from the inner or outer of the coaxial outlets as appropriate in a stable and convenient manner.

The provision of (preferably, at least) two coaxial drive outlets operable at distinct speeds improves the range of attachments (for example, to include high and low speed attachments) that may be driven by the stand mixer. Furthermore, the downwardly-facing drive outlet that is, preferably, offset from the coaxial drive outlets may be used simultaneously alongside one (or both) of the coaxial drive outlets. Advantageously, the downwardly-facing drive outlet and coaxial drive outlets are driven by the same motor and epicyclic gearbox arrangement, thereby eliminating the need for each drive outlet to have a separate motor and corresponding gearing.

Preferably, the inner of said coaxial drive outlets and the sun wheel of said epicyclic gearbox are driven directly, and at a relatively high speed (i.e. the operating speed of the motor), by said drive shaft, and the outer of said coaxial drive outlets is driven, at a lower speed then the inner drive outlet, from a planet carrier of said gearbox.

In a preferred arrangement of the above kind, said transmission means includes transfer means configured to convey, from said epicyclic gearbox to said downwardly-facing drive outlet, rotational drive at a substantially lower speed than said outer drive outlet. Advantageously, the downwardly-facing drive outlet is operable by means of the motor and the epicyclic gearbox.

It is particularly preferred that said transfer means comprises a belt and pulley system, and that the driven pulley of said belt and pulley system is driven from the planet carrier of said epicyclic gearbox.

Conveniently, in such a system, the driven pulley and a driving member for the outer of said coaxial outlets are integrally formed and are securely but removably attached to said planet carrier.

Preferably, in such circumstances, said planet carrier is of metallic construction and formed with a central aperture to accommodate the drive shaft of said motor; a lip region of the planet carrier surrounding the aperture supporting an axially-extending central plastic drive form, overmoulded thereon, which presents external surface features complementary to internal surface features formed centrally of the said integral driving member and driven pulley, whereby the said integral driving member and driven pulley can be press-fitted to said drive form.

Further preferably, the external surface of the drive form is provided with one component of an annular clip, the other component of which is provided on the internal surface of said integral driving member and driven pulley whereby, when press-fitted together, the two components of the clip snap into place, thereby latching the driving member and driven pulley securely to the drive form, but facilitating their separation, by unclipping them, if required for servicing.

SUMMARY

In preferred embodiments, the mixer further comprises means associated with said coaxial outlets for encouraging fluid spilt in the vicinity of said coaxial outlets to flow into a collection means, and further means adapted to conduct collected fluid out of the mixer; thereby impeding ingress of said fluid into said gearbox.

For safety, preferably, the stand mixer is enveloped by a casing, within which the first and second coaxial driving outlets are recessed.

According to another aspect of the invention, there is provided a kit comprising: a stand mixer, preferably as described above; a first attachment for coupling to a first drive outlet of the stand mixer; a second attachment for coupling to a second drive outlet of the stand mixer; and a tool for coupling to a downwardly-facing drive outlet of the stand mixer.

The invention extends to a stand mixer substantially as described with reference to and/or as shown in the accompanying drawings. The invention also extends to a kit substantially as described with reference to and/or as shown in FIGS. 2 and 3.

The invention extends to methods and/or apparatus substantially as herein described with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

In order that the invention may be clearly understood and readily carried into effect, some embodiments thereof will now be described, by way of example only, with reference to the accompanying drawings, of which.

DESCRIPTION OF EXEMPLARY EMBODIMENTS

Figure 1:
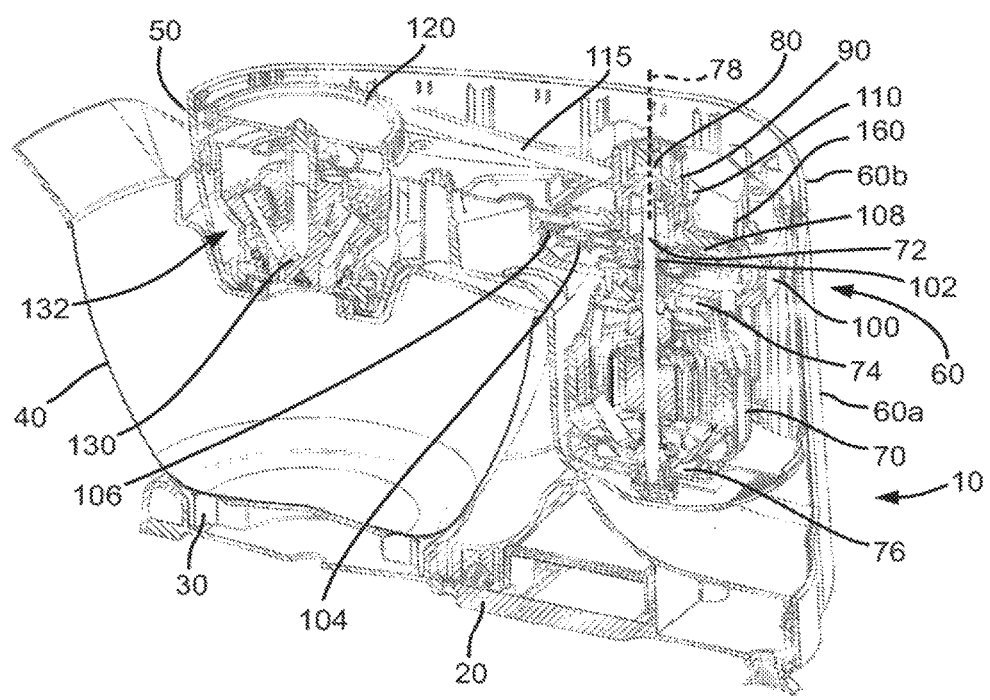
FIG. 1 shows, in cross-sectional view, a stand mixer in accordance with one embodiment.

Referring now to FIG. 1 of the drawings, a stand mixer 10 in accordance with a first embodiment comprises a base part 20, which includes a pedestal 30 for locating and supporting in an operational position a processing bowl 40 to contain ingredients for processing. The stand mixer 10 also includes a head part 50 which is supported and linked to the base part 20 by a generally upright portion 60.

The upright portion 60 comprises two parts; a lower part 60a which is integrally formed with the base 20, and an upper part 60b which is integrally formed with the head part 50 and is hingedly mounted to the lower part as shown so that, in conventional fashion, the head part can be raised relative to the base to facilitate the insertion and removal of the bowl 40 and/or of shanked mixing tools. The upper part 60b of the upright portion 60 houses an electric drive motor 70 driving a main drive shaft 72 that, in conventional manner, is journalled in upper and lower bearings 74 and 76 to rotate smoothly around its longitudinal axis 78 which of course is also the axis of the motor 70. It will be appreciated by those skilled in the art that any type of electric motor capable of appropriately powering the drive outlets of the stand mixer 10 can be used, and the particular form of motor shown in FIG. 1 is shown by way of example only.

Figure 2:
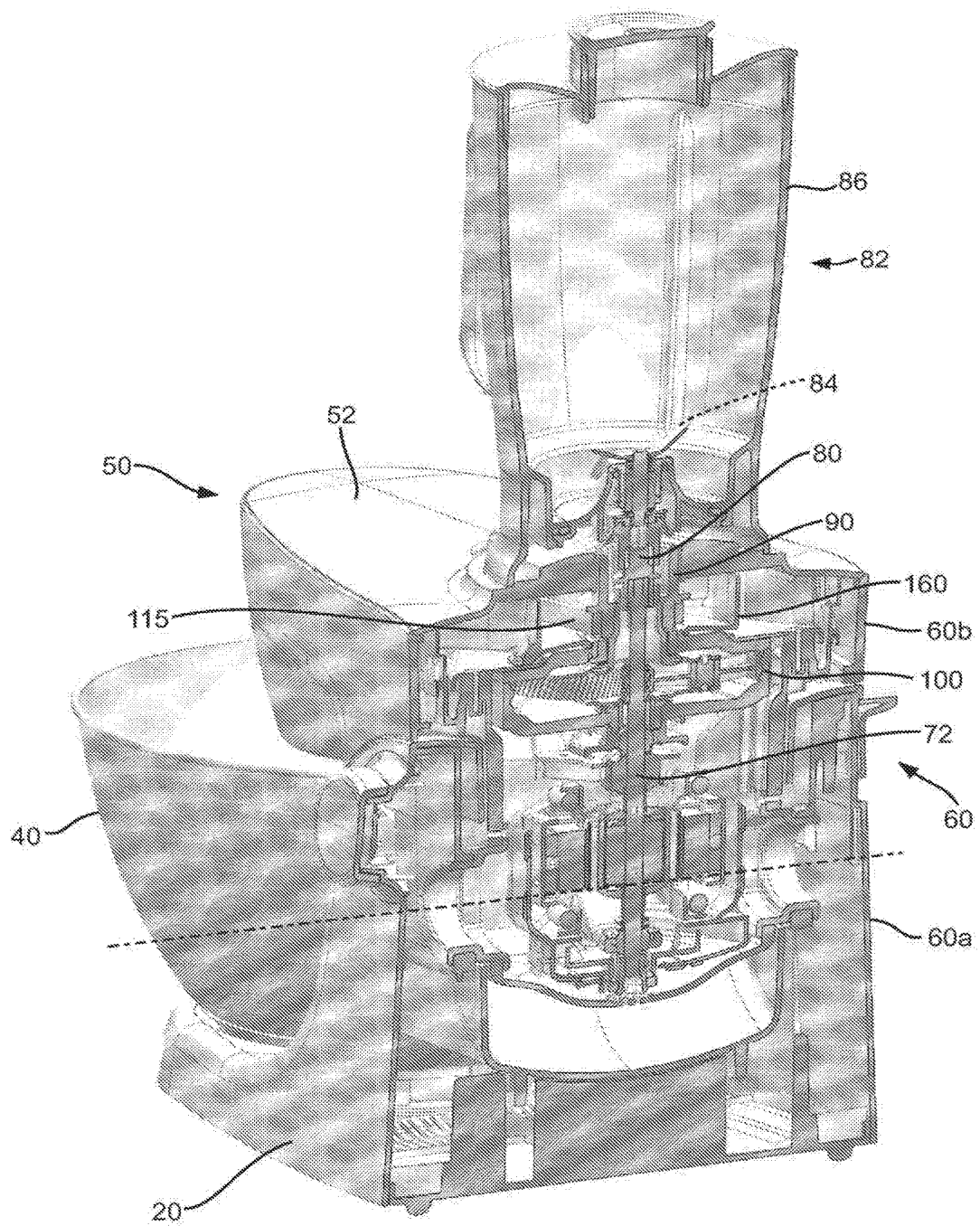
FIG. 2 shows a blender attachment coupled to the mixer of FIG. 1.

In this embodiment, the shaft 72 is used to directly drive a high speed drive outlet spigot 80 that can be used to power the blades 84 of a blender attachment, for example, at the operating speed of the motor 70. This is a beneficial and economical arrangement, since no intermediate gearing is required. FIG. 2 shows a blender attachment 82 coupled to the outlet spigot 80.

As can be seen from the drawing, the location of the outlet spigot 80 is sited on, or preferably recessed within, the upper surface 52 of the head unit 50 and directly above the motor 70, on the axis 78 of the main drive shaft 72. This is a convenient location for usage of the attachment 82, and it provides a stable configuration, since all of the relevant components are axially aligned.

Figure 3:
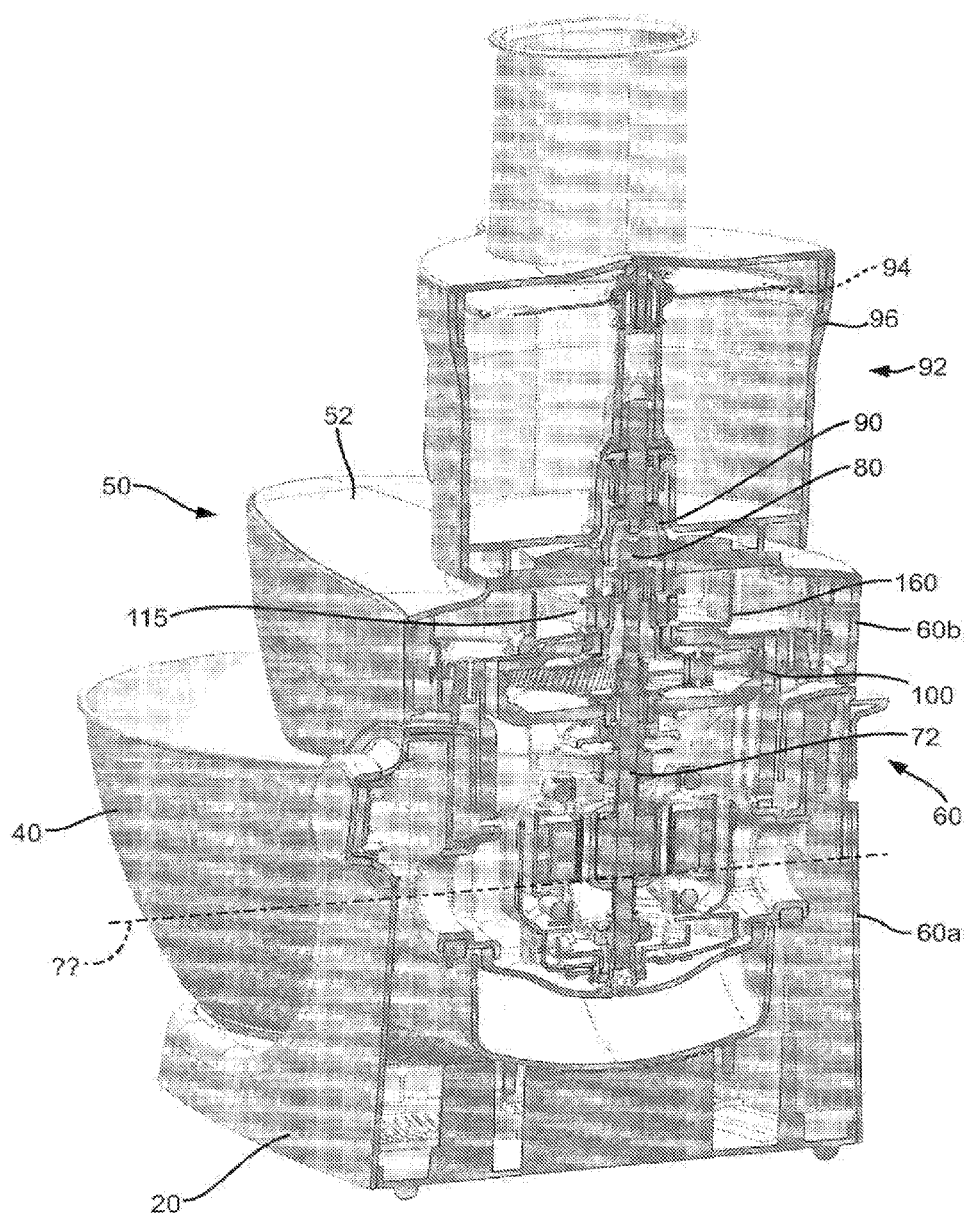
FIG. 3 shows a food processor attachment coupled to the mixer of FIG. 1.

In a particularly beneficial arrangement, the invention further provides a second, lower speed, drive outlet ring 90 which coaxially surrounds the outlet spigot 80. This permits attachments such as food processors and juicers, which need to be run at slower speeds than the blender 82, to be attached to the stand mixer 10 at the same stable location as the high-speed drive outlet 80. FIG. 3 shows a food processor attachment 92 coupled to the outlet ring 90. The attachment 92 in this case is fitted with a tool in the form of a disc-type cutter 94. However, as is well known, food processor attachments such as 92 can accommodate various different tools, such as blades, and the discoidal tool 94 is shown by way of example only.

It will be appreciated that the attachments 82 and 92, when coupled to the drive outlets 80 and 90 respectively for use, utilise known forms of "through-the-base" drive couplings to transfer the rotational drive from the outlets 80 and 90 to rotatable food-processing tools such as 84 and 94 respectively, mounted within blending goblets, such as 86, or food-processing bowls, such as 96, of the attachments 82 and 92 as appropriate. Such goblets and bowls are preferably fitted with closeable lids, and moreover safety interlocks of known kind are preferably provided to prevent the tools being driven unless the appliance is set up for safe operation.

The arrangement of drive outlets 80, 90 allows for a greater dynamic of operability of the stand mixer than if only one such outlet were provided. In one example, given that the output speeds imparted to an attachment is dependent upon—in part—the outlet to which a tool is coupled, both high and low speed attachments are available to be operated via outlets 80 and 90 respectively.

In one example, the blades 84 of a blender attachment (or another appropriate high-speed attachment) are driven by the high speed drive outlet spigot 80. The discoidal cutter of a food processor (or another appropriate low-speed attachment) is driven by the lower speed outlet spigot 90.

When the stand mixer is in use, the low speed and high speed outlet spigots operate simultaneously, along with the downwardly-facing drive outlet.

In a particularly preferred arrangement, as shown in FIG. 1, the coaxial outlets 80 and 90 are provided by way of an epicyclic gearbox 100 configured such that its sun wheel 102 is directly driven by the main shaft 72. In this embodiment, there are three planet wheels such as 104, all driven by the sun wheel 102 and running within a fixed ring gear 106 which of course is centred on the axis 78 of the shaft 72.

The planet wheels such as 104 are all associated with a planet carrier 108 which rotates coaxially with, but at a slower rate than, the shaft 72. The carrier 108 is mounted to drive the ring outlet 90 and, by this means, an efficient and convenient coaxial dual-drive arrangement is provided capable of driving attachments with differing speed and torque requirements. The coaxial drive outlets are, moreover, sited at a convenient and stable location on the mixer 10. Furthermore, and importantly, the epicyclic gearbox 100 has a shallow envelope, measured along the axis 78, which permits the working height of the mixer's head unit 50 to be minimised; thus creating a relatively low operational centre of gravity for the attachments to the coaxial drive outlets and further enhancing the stability of the appliance as a whole. All of these features are clearly evident from the accompanying drawings; in particular FIGS. 2 and 3.

In a particularly beneficial configuration, the planet carrier 108, which provides the lower speed drive for outlet ring 90, is also arranged to turn a drive pulley 110 which carries a drive/timing belt 115 that is also connected to another pulley 120 and used to power the main slow-speed mixer/mincer outlet 130 of the mixer 10. In this example, the slow-speed outlet 130 is driven by way of another epicyclic gearbox 132 utilising bevelled planet gears, but it will be appreciated that any convenient planetary or fixed-axis drive can be employed. Of importance in this embodiment is the fact that the main drive from the shaft 72 is not only directly available for the coaxial drive outlets 80 and 90 but is also conveyed efficiently and economically to the slow-speed drive outlet 130 which, in most cases, is the principal outlet of the mixer 10 and is used principally for mixing, kneading and other food processing operations in the bowl 40.

Figure 4:
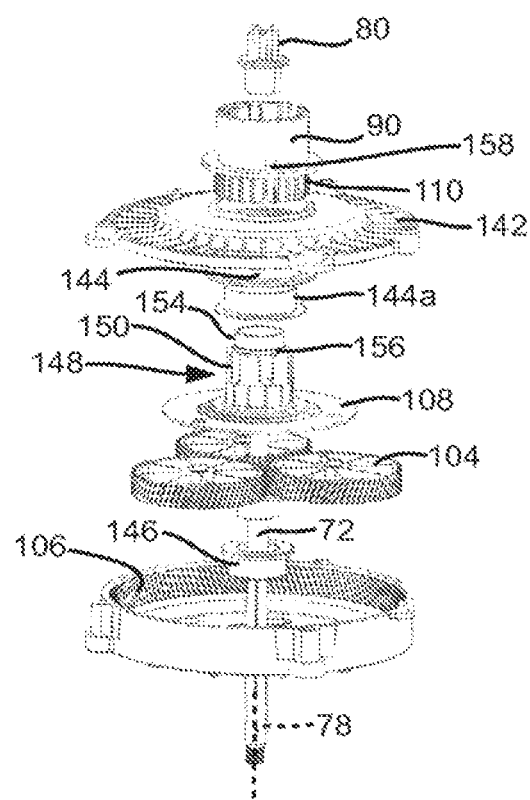
FIG. 4 shows, in perspective and exploded view, certain critical components of the mixer shown in FIG. 1.
Figure 5:
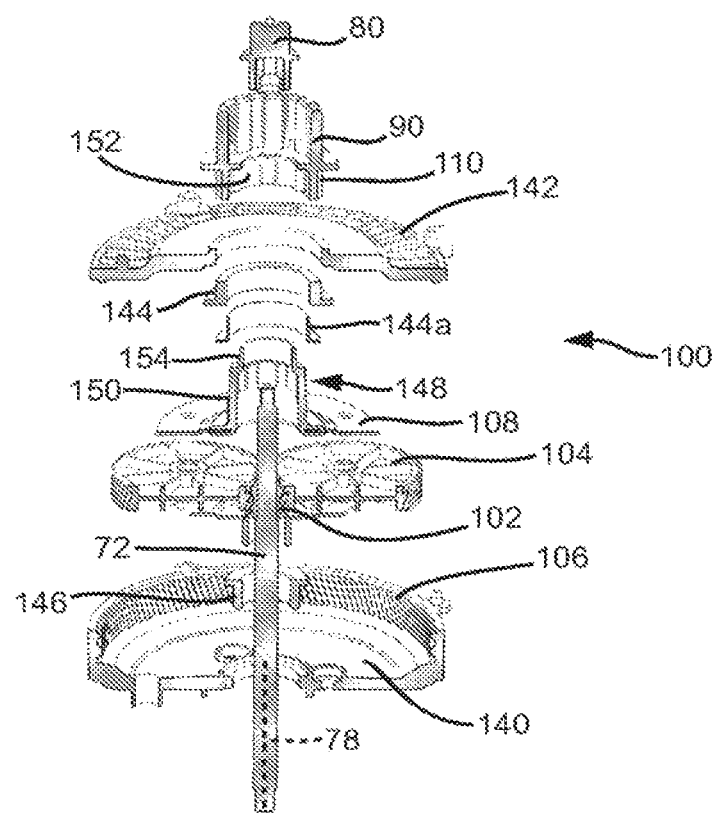
FIG. 5 shows the components of FIG. 4 in exploded and cross-sectional view.

FIGS. 4 and 5, to which reference will now additionally be made, show the detailed construction of the epicyclic gearbox, its relationship to the coaxial drive outlets 80 and 90, and its association with other relevant components.

The working components of the gearbox 100 are housed within a casing comprising, on the one hand, the ring gear 106 with an associated base 140 that is centrally apertured to accommodate the shaft 72, and, on the other hand, a top cover plate 142 that is also apertured to permit the shaft 72 to pass therethrough. The casing components 106, 140 on the one hand and 142 on the other hand are, in this example, formed with the necessary fitments to enable them to be assembled together by means of the so-called "poke-yoke" system. Upper and lower gearbox bearings 144 and 146, located in the central apertures of the top cover plate 142 and the base 140 respectively, are provided for the shaft 72 to help absorb the transverse loadings imparted to the system by the drive/timing belt 115 via the pulley 110. The sleeve 144a for the upper bearing 144 is also shown.

In this preferred embodiment, the planet carrier 108 is formed of sheet metal, and is overmoulded with a plastics drive form 148 which provides not only external surface features 150 complementary to internal surface features 152 formed in the drive ring 90 and utilised to couple the motion of the planet carrier 108 to the drive outlet ring 90, but also a spillage retaining wall 154, the provision of which is one of a number of steps taken to reduce the risk of liquid spillage from the attachments 82 or 92 entering the gearbox 100, as will be explained in more detail hereinafter.

The drive outlet ring 90 is integrally formed with a lower extension providing the pulley 110 so that, when assembled, both components are directly driven by the drive form 148 overmoulded to the planet carrier 108. By this means an efficient and economical drive system is provided. The ring 90 is pushed on to the drive form 148 so that the external surface features 152 of the drive form 148 mesh tightly with the internal surface features 152 of the ring 90, and the two components are fastened together by means including a retaining clip 156 integrated into the drive form 148. The parts 90 and 148 can be separated if required for servicing by manipulation of the retaining clip 156.

The central, high-speed drive outlet spigot 80 is fitted to the end of the shaft 72 and firmly secured thereon by any convenient means for non-slipping rotation with the shaft 72.

It has previously been mentioned that steps, including the provision of the spillage retaining wall, are taken to reduce the risk of fluids spilt in the vicinity of the drive couplings 80, 90 from entering the gearbox 100. Additional features used in this respect include a drainage aperture 158 formed in the ring 90 above the rim of pulley 110. This aperture 158 co-operates with the retaining wall 154 to encourage spillage to exit the system, away from the shaft 72. Spilt fluids exiting the aperture 158 are collected by a plastics collection member (or so-called drip tray) 160, which is fixed in place, and is configured to collect spillage and channel it safely to the exterior of the appliance by way of a series of channels and drainage holes.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

What is claimed is:
1. A stand mixer comprising:
   a head unit having a lower surface presenting, in operation, a downwardly- facing drive outlet for driving in rotation at least one tool suspended therefrom;

support means for supporting said head unit with said downwardly-facing drive outlet above a receiving location for a mixing bowl;

driving means including an electric motor having a drive shaft, and associated transmission means for conveying rotary drive to said downwardly-facing drive outlet, the motor being housed in said support means;

first and second coaxial driving outlets presented on an upper surface of said head unit, said first and second coaxial outlets running at different speeds; and an epicyclic gearbox arranged to be driven by the motor, and arranged to drive the first and second coaxial drive outlets;

wherein the first coaxial drive outlet and a sun wheel of said epicyclic gearbox are driven at a relatively high speed by said motor, and wherein the second coaxial drive outlet is driven at a lower speed than said first coaxial drive outlet from a planet carrier of said gearbox.

2. The mixer according to claim 1, wherein said transmission means includes transfer means configured to convey, from said epicyclic gearbox to said downwardly-facing drive outlet, rotational drive at a substantially lower speed than said first and second coaxial drive outlets.

3. The mixer according to claim 1, wherein, in use of the stand mixer, one or both of the first and second driving outlets and the downwardly-facing drive outlet operate simultaneously.

4. The mixer according to claim 1, wherein the downwardly-facing drive outlet and the coaxial drive outlets are driven by the same motor and epicyclic gearbox arrangement.

5. The stand mixer according to claim 1, in which the motor is housed in the support means.

6. The stand mixer according to claim 1, wherein the downwardly-facing drive outlet is a planetary drive outlet.

7. The mixer according to claim 1, further comprising means associated with said coaxial outlets for encouraging fluid spilt in the vicinity of said coaxial outlets to flow into a collection means, and further means adapted to conduct collected fluid out of the mixer; thereby impeding ingress of said fluid into said gearbox.

8. A kit comprising: a stand mixer according to claim 1, a first attachment for coupling to a first drive outlet of the stand mixer; a second attachment for coupling to a second drive outlet of the stand mixer; and a tool for coupling to a downwardly-facing drive outlet of the stand mixer.

9. The kit according to claim 1, wherein the first attachment comprises a blender attachment configured to be attached to the first driving outlet running at a higher speed such that blades of the blender attachment are driven directly by the first driving outlet.

10. The kit according to claim 1, wherein the second attachment comprises a food processor having a processing tool, the processor being configured to be attached to the second driving outlet running at a lower speed such that the processing tool is driven directly by the second driving outlet.

11. The kit according to claim 10, in which the food processor is a juicer.

12. The kit according to claim 1, wherein the first and second attachments each comprise a drive coupling configured to transfer rotational drive form the first and second drive outlets through the base of the attachment to rotatable food processing tools mounted within the attachment.

13. The kit according to claim 1, wherein the first and second attachments are each fitted with a closable lid having a safety interlock arranged to prevent the tools being driven unless the lid is closed.

14. The kit according to claim 8, wherein the tool is a mixing tool.

* * * * *